United States Patent
Nakagawa (10) Patent No.: US 6,392,167 B1
(45) Date of Patent: May 21, 2002

(54) ACOUSTIC TOUCH POSITION SENSING SYSTEM WITH LARGE TOUCH SENSING SURFACE

(75) Inventor: Yoshikatsu Nakagawa, Machida (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/306,784

(22) Filed: May 7, 1999

(30) Foreign Application Priority Data

May 7, 1998 (JP) ............................................ 10-140612

(51) Int. Cl.[7] .............................................. G08C 21/00
(52) U.S. Cl. ................................ 178/18.04; 178/18.03; 178/18.01; 178/19.01
(58) Field of Search ........................... 178/18.04, 18.03, 178/18.01, 19.01

(56) References Cited

U.S. PATENT DOCUMENTS

| | | |
|---|---|---|
| 4,645,870 A | 2/1987 | Adler |
| 5,072,427 A | 12/1991 | Knowles |
| 5,142,506 A | 8/1992 | Edwards |
| 5,162,618 A | 11/1992 | Knowles |
| 5,177,327 A | 1/1993 | Knowles |
| 5,243,148 A | 9/1993 | Knowles |
| 5,260,521 A | 11/1993 | Knowles |
| 5,329,070 A | 7/1994 | Knowles |
| 5,334,805 A | 8/1994 | Knowles et al. |
| 5,573,077 A | 11/1996 | Knowles |
| 5,591,945 A | 1/1997 | Kent |
| 5,648,643 A | 7/1997 | Knowles et al. |
| 5,708,461 A | 1/1998 | Kent |
| 5,739,479 A * | 4/1998 | Davis-Cannon et al. ...... 178/19 |
| 5,854,450 A * | 12/1998 | Kent ........................ 178/18.04 |
| 5,986,224 A * | 11/1999 | Kent ........................ 178/18.04 |
| 6,087,599 A * | 7/2000 | Knowles ................... 178/18.04 |

\* cited by examiner

*Primary Examiner*—Richard Hjerpe
*Assistant Examiner*—Jean Lesperance
(74) *Attorney, Agent, or Firm*—Oblon, Spivak, McClelland, Maier & Neustadt, P.C.

(57) ABSTRACT

A touch position sensing system including a transducer configured to transmit and modulate by pseudo random coding acoustic waves and to decode reflected waves generated by the acoustic waves by autocorrelating the pseudo random coding; a substrate configured to propagate the acoustic waves, including a touch surface having a first axis along a side of the perimeter of the substrate and a second axis which is perpendicular to the first axis and located along a second side of the perimeter; and, a first reflective array configured to reflect the acoustic waves transmitted by the transducer such that reflected waves are generated traveling parallel to the second axis, having a length substantially as long as the side of the perimeter corresponding to the first axis including partially reflective grating along the length and disposed lengthwise along the first axis of said substrate. Wherein, a touch to the touch surface attenuates the reflected waves such that said modulation by pseudo random coding of acoustic waves is varied, the transducer configured to detect the location of the touch based on variation in autocorrelation of the varied pseudo random coding included in the reflected waves.

14 Claims, 7 Drawing Sheets

ACOUSTIC TOUCH POSITION SENSING SYSTEM WITH LARGE TOUCH SENSING SURFACE

BACKGROUND OF THE INVENTION

1. Field of the Invention

The present invention relates generally to an acoustic touch position sensing system, and more particularly to a touch position sensing system with a large touch surface, wherein the system is capable of detecting a position of a touch on the surface without using large amplitude acoustic waves.

2. Description of the Related Art

Acoustic touch position sensing systems are known to include a touch panel having an array of transmitters positioned along a first edge of a substrate for simultaneously generating parallel acoustic waves that directionally propagate through the panel to an array of detectors positioned opposite the first array on a second edge of the substrate. Another pair of arrays is provided at appropriate angles to the first set.

Figure 2:
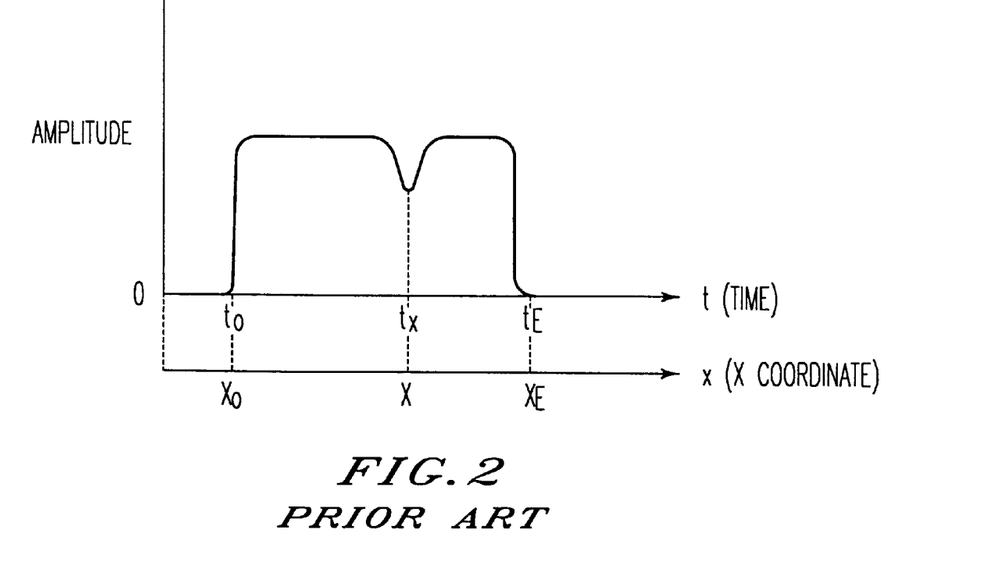
FIG. 2 is an illustration of a waveform of acoustic waves attenuated by the touch of a finger or a stylus.

When an object (e.g. a part of the human body like a finger, or a stylus, a bar) touch the surface of the substrate, the touch attenuates the acoustic waves passing through the point of the touch. The attenuation reflects the location of the point of the touch as shown in FIG. 2. Thus, the sensing system is capable of detecting the coordinates of the touch on the surface based upon the attenuated acoustic waves via the two sets of detectors.

Figure 1:
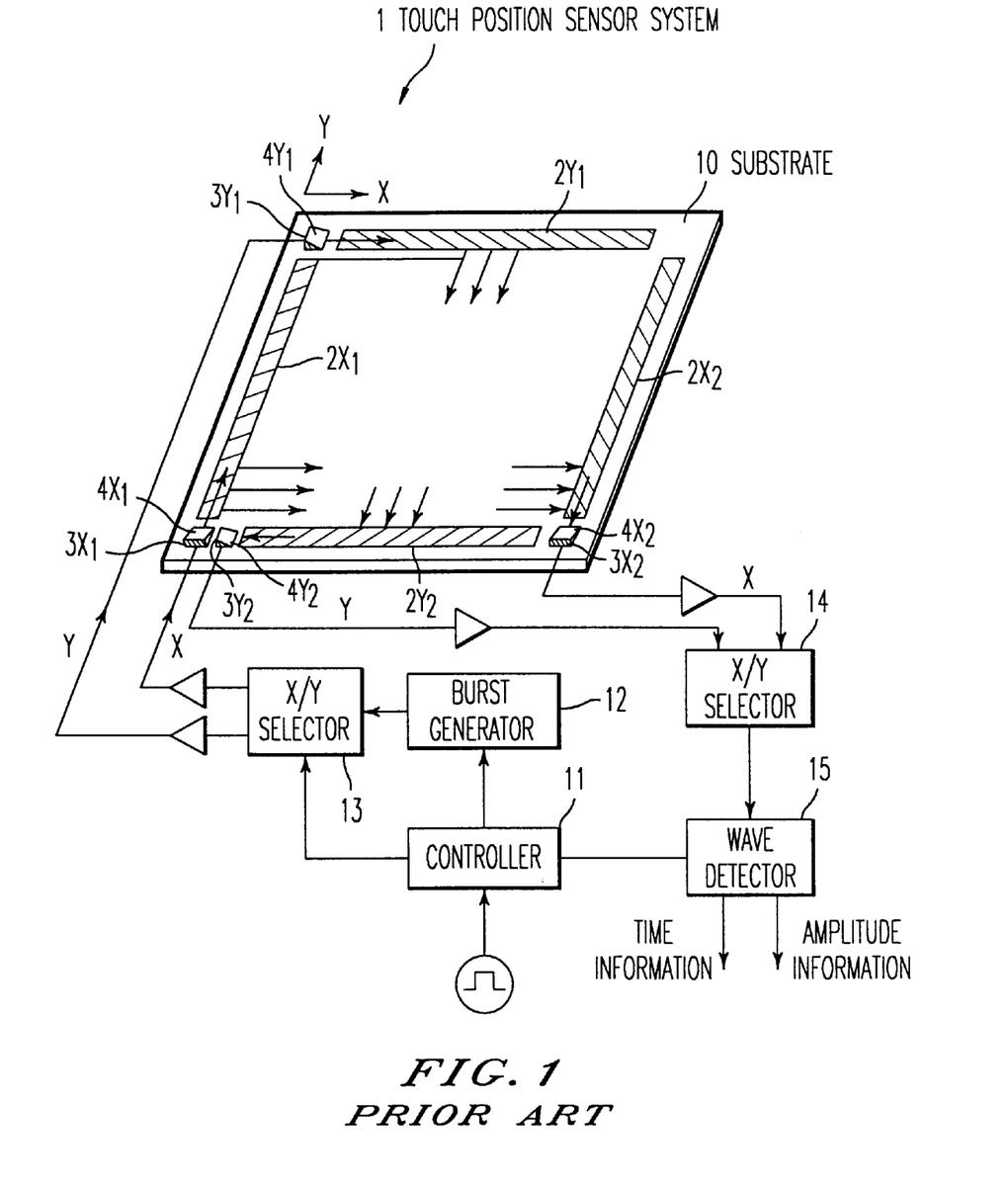
FIG. 1 is a block diagram of an acoustic touch sensing system of the prior art.

One such acoustic touch position sensing systems is disclosed in U.S. Pat. No. 5,591,945 to Kent. The detailed description of this system is hereby incorporated by reference. The system employs shear wave propagation. Shear waves are (1) immune to noise created by asperities on the surface of the substrate and (2) have low attenuation. The attenuation of shear waves is ⅕ of the attenuation of common Rayleigh mode waves.

With reference to FIG. 1, the touch position sensing system 1 comprises a substrate 10 with a touch sensing surface, a controller 11, a burst signal generator 12, X/Y selectors 13 and 14, and a wave detector 15. The substrate 10 is a rectangular glass plate and has four reflective arrays $2X_1$, $2X_2$, $2Y_1$, and $2Y_2$ along each edge and also has transmitting transducers $3X_1$, and $3Y_1$ and corresponding receiving transducers $3X_2$ and $3Y_2$ which are placed on the four corners of the substrate 10, respectively. The touch sensing surface comprises the area enclosed by the four reflective arrays $2X_1$, $2X_2$, $2Y_2$, and $2Y_2$ in the substrate 10.

The reflective arrays $2X_1$, $2X_2$, $2Y_1$, and $2Y_2$ produce acoustic waves propagating at 90 degree to the original angle of transmission. The reflective arrays are formed of an acoustically partially reflective structure (grating) along its length. These reflective arrays may be formed on one or both sides of the substrate. Because the touch sensor is generally placed in front of a display device, the reflective arrays are generally placed at the periphery of the substrate, outside of the active sensing area, and are hidden or protected under a cover.

Each transducer $3X_1$, $3X_2$, $3Y_1$, and $3Y_2$ is connected to the surface to the substrate 10 via wedges $4X_1$, $4X_2$, $4Y_1$, and $4Y_2$. The transmitting transducer $3X_1$, generates longitudinal waves corresponding to the X coordinates of a touch position. The transmitting transducer $3Y_1$ generates longitudinal waves corresponding to the Y coordinates of a touch position. The generated acoustic waves are propagated on the surface of the substrate 10 via wedges $4X_1$ and $4Y_1$.

For example, in order for the system 1 to detect the X coordinate of a touch position, the controller 11 selects X/Y selector 13 and burst signals from the burst signal generator 12 are supplied to the X coordinate transmitting transducer $3X_1$. The supplied burst acoustic waves are propagated through the reference reflective array $2X_1$ via the wedge $4X_1$. Each grating of the reflective array $2X_1$ partially reflects the burst acoustic waves 90 degrees toward the opposite reflective array $2X_2$. The reference reflective array $2X_2$ reflects the propagating acoustic waves 90 degree toward the receiving transducer $3X_2$. The receiving transducer $3X_2$ receives each acoustic wave via the wedge $4X_2$ and converts the acoustic waves to electronic signals. The wave detector 15 detects both amplitude and time information of each received electronic signal corresponding to the propagating acoustic waves.

In order for the system 1 to detect the Y coordinate of a touch position, the controller 11 selects X/Y selector 13 and burst signals from the burst signal generator 12 are supplied to the Y coordinate transmitting transducer $3Y_1$. The supplied burst acoustic waves are propagated through the reference reflective array $2Y_1$ via the wedge $4Y_1$. Each grating of the reflective array $2Y_1$ partially reflects the burst acoustic waves 90 degrees toward the receiving transducer $3Y_2$. The receiving transducer $3Y_2$ receives each acoustic wave via the wedge $4Y_2$ and converts the acoustic waves to electronic signals.

The position of the touch in the active sensing area within the surface of the substrate 10 can be determined by providing an opposing reflective grating which directs the surface acoustic wave pattern along an axis of the grating toward a receiving transducer system. The touch sensing system 1 records the time of arrival of an attenuation of the wave pattern which corresponds to a position along the axis of the arrays. However, the larger the display size, the higher the transmitting loss of propagating acoustic waves.

The prior art system is effective for touch sensing areas as large as 50 inches. Today, however, there is a demand for a touch position-sensing system which can be used in conference rooms, classrooms or the like. In order for the prior art system to be used in this manner, the signal to noise ratio (SNR) of the detected acoustic waves must maintain at least a minimum certain value. Thus, the amplitude and pulse width of the transmitting acoustic waves must be large. Therefore, the prior art systems must apply a huge instantaneous voltage to an acoustic wave transducer. However, huge voltage can destroy acoustic wave transducers with normal endurance. On the other hand, if the prior art system employs an acoustic wave transducer with high endurance, the cost of the system becomes high.

Figure 3:
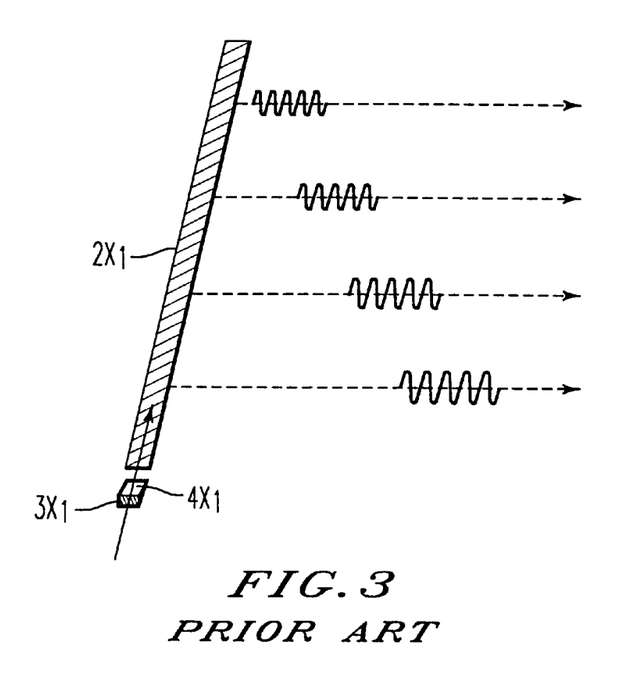
FIG. 3 is a schematic illustration of a reflecting array wherein the propagating acoustic waves gradually decrease as a function of distance from the transmitting transducer.

Moreover, since the grating of the reflective array $2X_1$ reflect the acoustic waves supplied by the transmitting transducer $3X_1$, the amplitude of the reflected acoustic waves is decreased the further the grating is from the transmitting transducer $3X_1$ as shown in FIG. 3. Thus, when the touch surface is large, the reflected acoustic waves become too small at the gratings of the reference reflective array $2X_1$ which are too distant from transmitting transducer $3X_1$.

SUMMARY OF THE INVENTION

Accordingly, an object of the present invention is to overcome the above stated problems encountered in the aforementioned art.

This object and others are achieved according to the present invention by providing a touch position sensing system which includes a transducer configured to transmit and modulate by pseudo random coding acoustic waves and to decode reflected waves generated by the acoustic waves by autocorrelating the pseudo random coding; a substrate configured to propagate the acoustic waves, including a touch surface having a first axis along a side of the perimeter of the substrate and a second axis which is perpendicular to the first axis and located along a second side of the perimeter; and, a first reflective array configured to reflect the acoustic waves transmitted by the transducer such that reflected waves are generated traveling parallel to the second axis, having a length substantially as long as the side of the perimeter corresponding to the first axis including partially reflective grating along the length and disposed lengthwise along the first axis of said substrate. Wherein, a touch to the touch surface attenuates the reflected waves such that said modulation by pseudo random coding of acoustic waves is varied, the transducer configured to detect the location of the touch based on variation in autocorrelation of the varied pseudo random coding included in the reflected waves.

According to a second embodiment of the present invention, a touch position sensing system is disclosed including a processor configured to determine a location of a touch to the touch surface, wherein a touch to the touch surface varies the phase of the acoustic waves traversing the touch location and the processor is configured to determine the touch location based on a detected variation in the phase of the reflected waves.

Lastly, according to a third embodiment of the present invention, a touch position sensing system is disclosed including a transducer configured to transmit acoustic waves and to receive reflected waves generated by the acoustic waves; plural reflectors each configured to redirect incident acoustic waves 180 degrees; a substrate configured to propagate the acoustic waves, including a touch surface divided into quadrants by the transducer, a first reflector and a second reflector, each quadrant having orthogonal first and second axis; first reflective arrays extending along the first axis at opposite sides of said substrate, each including a reflective grating configured to reflect acoustic waves transmitted by the transducer in a direction parallel to the second axis in a respective quadrant, the first reflective arrays configured to reflect acoustic waves to the opposing one of said plural reflectors and receive acoustic waves redirected 180 degrees by the opposing reflector for each of quadrants. Wherein, a touch to the touch surface varies the amplitude of the acoustic waves traversing the touch location, said transducer configured to detect the touch location along the first axis based on a detected variation in the amplitude of acoustic waves redirected by the respective reflectors in each quadrant.

BRIEF DESCRIPTION OF THE DRAWINGS

A more complete appreciation of the invention and many of the attendant advantages will be readily obtained as the same becomes better understood by reference to the following detailed description when considered in connection with the accompanying drawings, wherein.

DESCRIPTION OF THE PREFERRED EMBODIMENT

Figure 4:
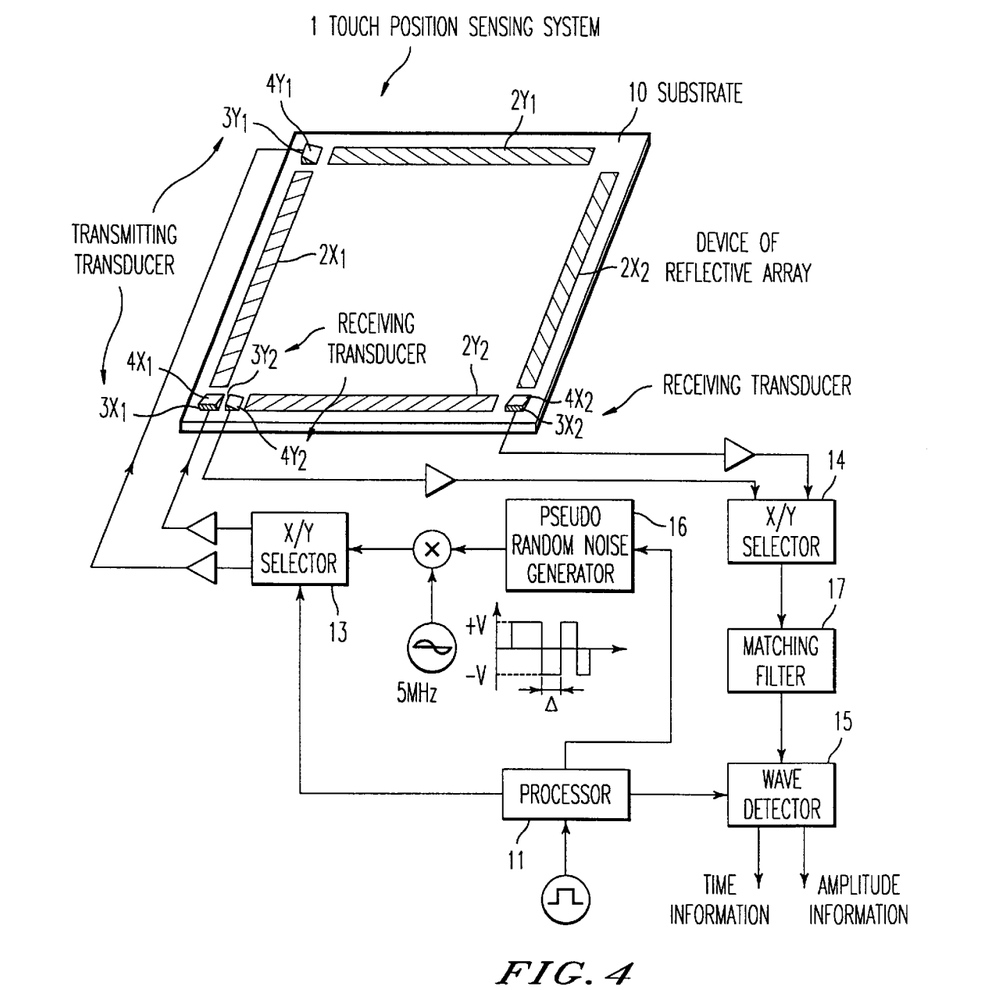
FIG. 4 is a block diagram of an acoustic touch sensing system of the present invention.

Referring now to the drawings, wherein like reference numerals designate identical or corresponding parts throughout the several views, and more particularly to FIG. 4 thereof, a block diagram of a the touch position sensing system is shown having a substrate 10, a processor 11, a pseudo random noise generator 16, X/Y selectors 13 and 14, a wave detector and a matching filter 17. The substrate 10 of the touch position sensing system 1 comprises a rectangular glass plate wherein four reflective arrays $2X_1, 2X_2, 2Y_1$, and $2Y_2$ are formed along each edge of the substrate 1, and transmitting transducers $3X_1$ and $3Y_1$ and corresponding receiving transducers $3X_2$ and $3Y_2$ are placed on each corner of the substrate 10, respectively. The substrate 10 is preferably transparent to allow efficient and effective use of the touch sensor as a panel which can be placed in front of a visual display device, such as a cathode ray tube, plasma display panel (PDP), electroluminescent display, or liquid crystal display.

Figure 5:
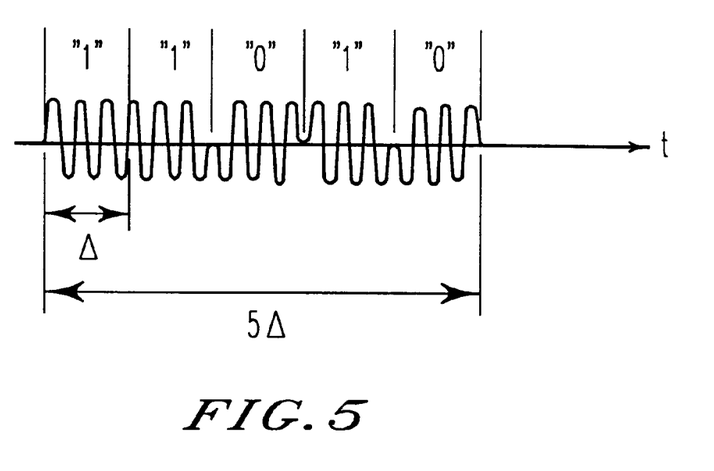
FIG. 5 is an illustration of signal train coded by pseudo random codes.
Figure 6:
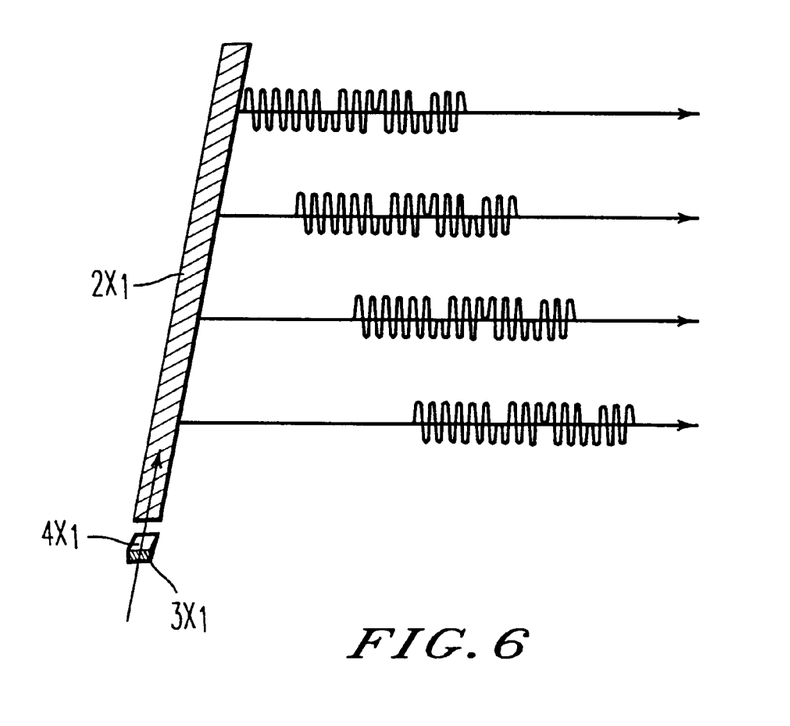
FIG. 6 is a schematic illustration of the propagation of acoustic waves coded by pseudo random codes from the reflective arrays.

A pseudo random noise generator 16 generates a Barker sequence code. Referring to FIG. 5, the system employs a five (5) chip Barker sequence code such as "11010," wherein each chip has a duration Δ and the five chip Barker sequence code constitutes the width of a burst pulse. Now, referring to FIG. 6, when the transmitting transducer $3X_1$ is driven by the five chip Barker sequence code via the X/Y selector 13, the generated acoustic waves, which have periods equal to 5Δ, propagate through the surface of the substrate 10 by way of the reflective arrays $2X_1$. The receiving transducer $3X_2$ (not shown) receives the propagating acoustic waves from the reflective arrays $2X_2$ and converts the received acoustic waves to electronic signals.

Figure 7:
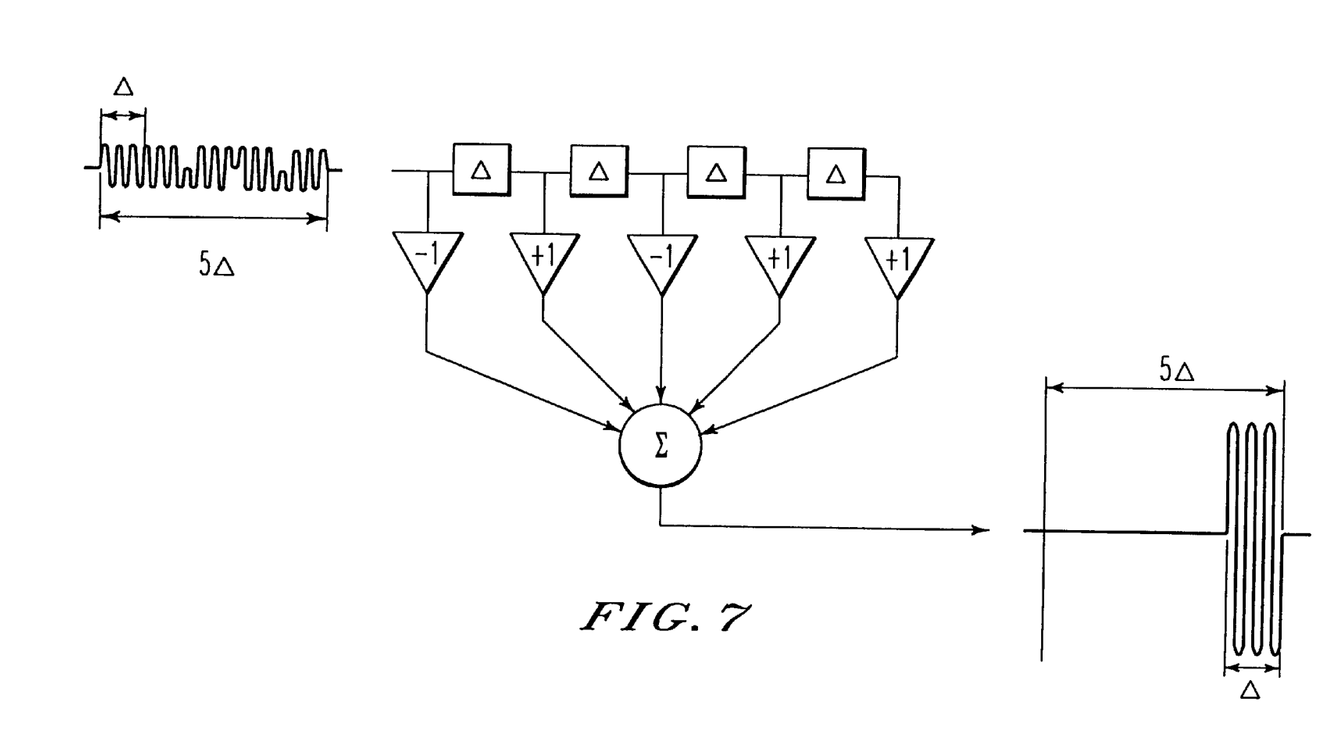
FIG. 7 is a schematic illustration of coding and decoding by a matching filter.

The matching filter 17 compresses the period of the five chip Barker sequence code to ⅕ its original period and expands the amplitude of the 5 chip Barker sequence code to 5 times its original amplitude by autocorrelation. See FIG. 7. The wave detector 15 then extracts the amplitude value from the output of the matching filter 17. Because the matching filter 17 compresses the pseudo random noise signals by autocorrelation, the pseudo random noise signals can be extracted in a period equal to Δ. Thus, although the burst signal has a transmission period equal to 5Δ, the wave detector 15 can receive the burst signal during a time period Δ.

Furthermore, although the acoustic touch position sensing system in the present invention employs a burst signal of ⅕ the amplitude of prior art systems, in comparison with the prior art system, the present system has the same time resolving ability of the prior art. Therefore, the acoustic touch position sensing system has 5 times the SNR of prior art system and is capable of being used as a large touch sensing surface.

Figure 8:
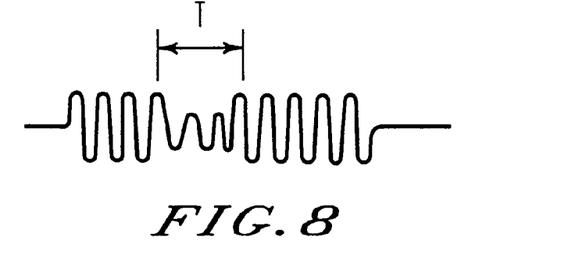
FIG. 8 is an illustration of a waveform of an acoustic wave wherein the phase is disturbed by the touch of a finger or a stylus.
Figure 9:
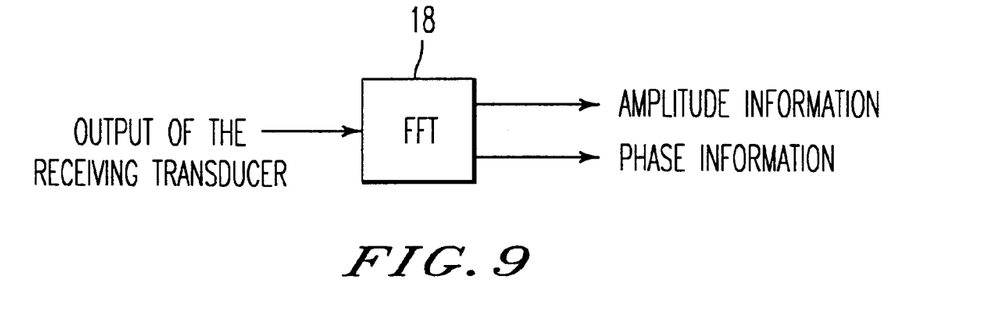
FIG. 9 is a block diagram of a phase disturbance detector pursuant to a second embodiment of the invention.

With reference to FIG. 8, a wave sequence of the acoustic wave attenuated by the touch of a finger or a stylus is shown. The time "T" represents the time that the finger or the stylus touches the surface of the substrate 10. During time "T," an attenuation and a phase disturbance is generated in the wave sequence corresponding to the touch position. With reference to FIG. 9, a disturbance detector 18 is shown which can replace the matching filter 17 and the wave detector 15 of the first embodiment. The disturbance detector 18 receives as input the output signal of the receiving transducer via the X/Y selector 14, carries out a Fast Fourier Transfer (FFT) analysis, and calculates both amplitude information and phase information of the received acoustic waves.

Figure 10A:
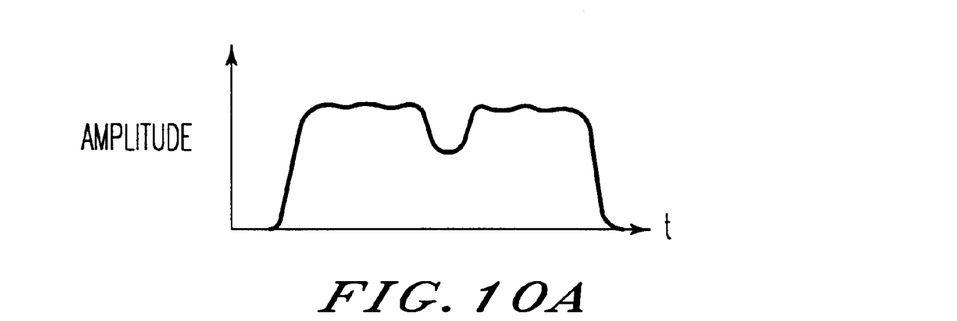
FIG. 10 is an illustration of the relationship between the amplitude and the phase of an acoustic wave.
Figure 10B:
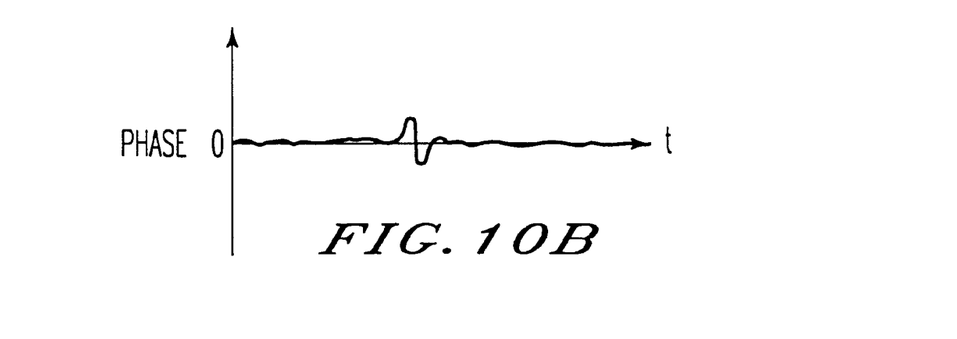

Now referring to FIGS. 10(A) and (B), the calculated amplitude waveform is attenuated at the position of the touch as shown in FIG. 10(A). The calculated phase of the waveform corresponding to the point of the touch is shown in FIG.10(B). The calculated amplitude is susceptible to noise; however, the calculated phase is not. Therefore, the acoustic touch position sensing system in the second embodiment of the invention is capable of detecting the position of a touch even when the touch position sensing system has a large touch surface or is effected by noise.

Figure 11:
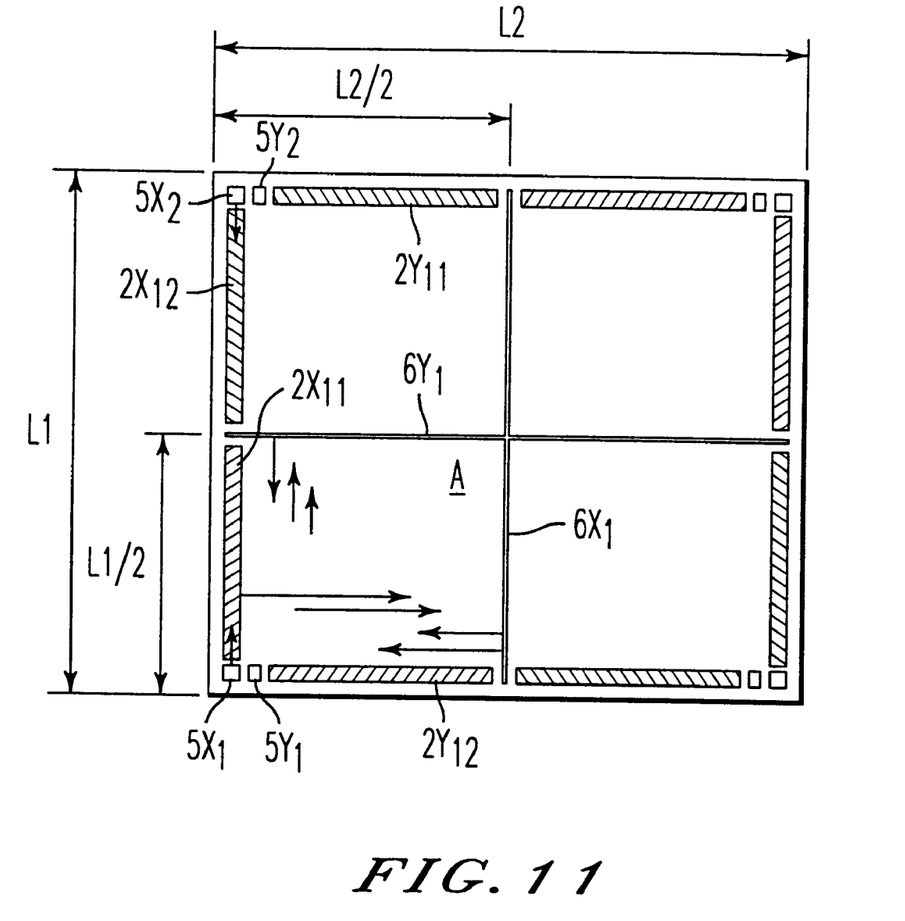
FIG. 11 is a schematic illustration of a touch panel separated into quadrants pursuant to a third embodiment of the invention.

With reference to FIG. 11, an acoustic touch sensing system in accordance with the third embodiment of the invention is shown. The acoustic touch sensing surface is separated into quadrants by reflectors $6X_1$ and $6Y_1$. Position sensing is carried out in each quadrant. Each quadrant is equipped with a transmitting transducer, a corresponding receiving transducer, and a pair of reflector arrays.

The operation of the touch position sensing system in quadrant A is as follows. The transmitting transducer $5X_1$ propagates the acoustic waves to the reflective arrays $2X_{11}$. The transmitted acoustic waves are partially reflected by reflective array $2X_1$ 90 degree toward opposite reflector $6X_1$. The propagating acoustic waves are further reflected 180 degree to the reflective array $2X_{11}$ by the reflector $6X_1$. When a finger or stylus touch the surface of quadrant A, the propagating acoustic wave is attenuated at the point corresponding to the touch position. Y coordinates are determined in the same manner utilizing transmitting transducer $5Y_1$, reflective array $2Y_{12}$ and reflector $6Y_1$. Moreover, X and Y coordinates corresponding to a touch position located in the other three quadrants are determined in the same manner for each quadrant, respectively.

The maximum distance of the propagating path according to this embodiment is "L1+L2." On the other hand, in the prior art, the maximum distance of the propagating path is "2L1+L2." Thus, the propagating loss found in this embodiment is relatively small as compared to the prior art because the propagating path is shorter than the propagating path taught in the prior art.

Having now fully described the invention, it will be apparent to one of ordinary skill in the art that many changes and modifications can be made thereto without departing from the spirit and scope of the invention as set forth herein. The application is based on Japanese Patent Application No. JPAP10-140,612, filed May 7, 1998. The entire contents are incorporated herein by reference.

The basic concept and detail of the pseudo noise are described in Chapter 1, "A Spread-Spectrum Overview", Chapter 3, "Basic Concepts and System Models 19, Chapter 5. "Pseudonoise Generators" of "Spread Spectrum Communications" Volume I, Marvin K. Simon et al, Computer Science Press. The entire contents of the above chapters are incorporated herein reference.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A touch position sensing system for detecting a location of a touch on a substrate having a four sided perimeter, comprising:

a transducer including a pseudo random noise generator, and configured to transmit and modulate by pseudo random coding acoustic waves and to decode reflected waves generated by the acoustic waves by autocorrelating said pseudo random coding;

a substrate configured to propagate the acoustic waves, including a touch surface having a first axis along a side of the perimeter of said substrate and a second axis which is perpendicular to the first axis and located along a second side of the perimeter; and, a first reflective array configured to reflect the acoustic waves transmitted by said transducer such that reflected waves are generated traveling parallel to the second axis, having a length substantially as long as the side of said perimeter corresponding to the first axis including partially reflective grating along said length and disposed lengthwise along said first axis of said substrate;

wherein a touch to the touch surface attenuates the reflected waves such that said modulation by pseudo random coding of acoustic waves is varied, said transducer configured to detect the location of the touch based on variation in autocorrelation of the varied pseudo random coding included in the reflected waves.

2. The system of claim 1, further comprising:

a second reflective array configured to reflect the acoustic waves transmitted by said transducer such that reflected waves are generated traveling parallel to the second axis, having a length substantially as long as the side of the perimeter corresponding to the second axis including partially reflective grating along said length and disposed lengthwise along said second axis of said substrate.

3. The system of claim 1, wherein said transducer comprises:

a transmitter configured to transmit and modulate by pseudo random coding the acoustic waves; and, a receiver configured to decode the reflected waves generated by the acoustic waves by autocorrelating said pseudo random coding.

4. The system of claim 3, further comprising:

a second reflective array configured to reflect the acoustic waves transmitted by said transducer such that reflected waves are generated traveling parallel to the second axis, having a length substantially as long as the side of the perimeter corresponding to the second axis including partially reflective grating along said length and disposed lengthwise along said second axis of said substrate.

5. A touch position sensing system for detecting a location of a touch on a substrate having a four sided perimeter, comprising:

a transducer configured to transmit acoustic waves and to receive reflected waves generated by the acoustic waves;

plural reflectors each configured to redirect incident acoustic waves 180 degrees;

a substrate configured to propagate the acoustic waves, including a touch surface divided into quadrants by said transducer, a first reflector and a second reflector, each quadrant having orthogonal first and second axis;

first reflective arrays extending along said first axis at opposite sides of said substrate, each including a reflective grating configured to reflect acoustic waves transmitted by said transducer in a direction parallel to said second axis in a respective quadrant, said first reflective arrays configured to reflect acoustic waves to the opposing one of said plural reflectors and receive acoustic waves redirected 180 degrees by the opposing reflector for each of said quadrants;

wherein a touch to the touch surface varies the amplitude of the acoustic waves traversing the touch location, said transducer configured to detect the touch location along the first axis based on a detected variation in the amplitude of acoustic waves redirected by the respective reflectors in each quadrant.

6. The system of claim 5, further comprising:

second reflective arrays extending along said second axis at opposite sides of said substrate, each including a reflective grating configured to reflect acoustic waves transmitted by said transducer in a direction parallel to said first axis in a respective quadrant, said second reflective arrays configured to reflect acoustic waves to the opposing one of said plural reflectors and receive acoustic waves redirected 180 degrees by the opposing reflector for each of said quadrants;

wherein a touch to the touch surface varies the amplitude of the acoustic waves traversing the touch location, said transducer configured to detect the location along the second axis based on a detected variation in the amplitude of acoustic waves redirected by the respective reflectors in each quadrant.

7. A touch position sensing apparatus for detecting a location of a touch on a substrate having a four sided perimeter, comprising:

a transducer means for transmitting and modulating by pseudo random coding acoustic waves and to decode reflected waves generated by the acoustic waves by autocorrelating said pseudo random coding;

a substrate means for propagating the acoustic waves, including a touch surface having a first axis along a side of the perimeter of said substrate and a second axis which is perpendicular to the first axis and located along a second side of the perimeter; and, a first reflective array means for reflecting the acoustic waves transmitted by said transducer such that reflected waves are generated traveling parallel to the second axis, having a length substantially as long as the side of said perimeter corresponding to the first axis including partially reflective grating along said length and disposed lengthwise along said first axis of said substrate;

wherein a touch to the touch surface attenuates the reflected waves such that said modulation by pseudo random coding of acoustic waves is varied, said transducer means detecting the location of the touch based on variation in autocorrelation of the varied pseudo random coding included in the reflected waves.

8. The apparatus of claim 7, further comprising:

a second reflective array means for reflecting the acoustic waves transmitted by said transducer such that reflected waves are generated traveling parallel to the second axis, having a length substantially as long as the side of the perimeter corresponding to the second axis including partially reflective grating along said length and disposed lengthwise along said second axis of said substrate.

9. The system of claim 7, wherein said transducer means comprises:

a transmitter means for transmitting and modulating by pseudo random coding the acoustic waves; and, a receiver means for decoding the reflected waves generated by the acoustic waves by autocorrelating said pseudo random coding.

10. The system of claim 9, further comprising:

a second reflective array means for reflecting the acoustic waves transmitted by said transducer such that reflected waves are generated traveling parallel to the second axis, having a length substantially as long as the side of the perimeter corresponding to the second axis including partially reflective grating along said length and disposed lengthwise along said second axis of said substrate.

11. A touch position sensing apparatus for detecting a location of a touch on a substrate having a four sided perimeter, comprising:

a transducer means for transmitting acoustic waves and for receiving reflected waves generated by the acoustic waves;

plural reflector means for redirecting incident acoustic waves 180 degrees;

a substrate means for propagating the acoustic waves, including a touch surface divided into quadrants by said transducer, a first reflector and a second reflector, each quadrant having orthogonal first and second axis;

first reflective array means extending along said first axis at opposite sides of said substrate, each including a reflective grating configured to reflect acoustic waves transmitted by said transducer in a direction parallel to said second axis in a respective quadrant, said first reflective arrays configured to reflect acoustic waves to the opposing one of said plural reflectors and receive acoustic waves redirected 180 degrees by the opposing reflector for each of said quadrants;

wherein a touch to the touch surface varies the amplitude of the acoustic waves traversing the touch location and said transducer means detects the touch location along the first axis based on a detected variation in the amplitude of acoustic waves redirected by the respective reflectors in each quadrant.

12. The system of claim 11, further comprising:

second reflective array means extending along said second axis at opposite sides of said substrate, each including a reflective grating configured to reflect acoustic waves transmitted by said transducer in a direction parallel to said first axis in a respective quadrant, said second reflective array means reflecting acoustic waves to the opposing one of said plural reflectors and receive acoustic waves redirected 180 degrees by the opposing reflector for each of said quadrants;

wherein a touch to the touch surface varies the amplitude of the acoustic waves traversing the touch location, said transducer means detecting the location along the second axis based on a detected variation in the amplitude of acoustic waves redirected by the respective reflectors in each quadrant.

13. A method of detecting a location of a touch on a substrate having a four sided perimeter, comprising the steps:

transmitting and modulating by pseudo random coding acoustic waves using a transducer and a pseudo random noise generater;

reflecting in one direction the acoustic waves transmitted by said transducer across the surface of a substrate including a touch surface having a first axis along a side of the perimeter of said substrate and a second axis which is perpendicular to the first axis and located along a second side of the perimeter, such that reflected waves are generated traveling parallel to the second axis; and, decoding reflected waves generated by the acoustic waves by autocorrelating said pseudo random coding; wherein a touch to the touch surface attenuates the reflected waves such that decoding said pseudo random coding reflects the location of the touch.

14. The method of claim 13, further comprising the step:

reflecting in a second direction the acoustic waves transmitted by said transducer across the surface of a substrate such that reflected waves are generated traveling parallel to the first axis.

* * * * *